(12) United States Patent
Fu (10) Patent No.: US 12,484,098 B2
(45) Date of Patent: Nov. 25, 2025

(54) METHOD AND DEVICE FOR CONTROLLING INTELLIGENT DEVICE, COMPUTER DEVICE, AND STORAGE MEDIUM

(71) Applicant: Shenzhen Lanhe Lighting Co., Ltd., Shenzhen (CN)

(72) Inventor: Pan Fu, Shenzhen (CN)

(73) Assignee: Shenzhen Lanhe Lighting Co., Ltd., Shenzhen (CN)

( * ) Notice: Subject to any disclaimer, the term of this patent is extended or adjusted under 35 U.S.C. 154(b) by 309 days.

(21) Appl. No.: 18/362,171

(22) Filed: Jul. 31, 2023

(65) Prior Publication Data

US 2024/0049314 A1  Feb. 8, 2024

(30) Foreign Application Priority Data

Aug. 1, 2022  (CN) .......................... 202210916152.0

(51) Int. Cl.
*H04W 48/10* (2009.01)
*H04W 4/80* (2018.01)
(Continued)

(52) U.S. Cl.
CPC ............. *H04W 76/14* (2018.02); *H04W 4/80* (2018.02); *H04W 8/005* (2013.01); *H04W 48/10* (2013.01); *H04W 84/18* (2013.01)

(58) Field of Classification Search
CPC ....... H04W 76/14; H04W 4/80; H04W 8/005; H04W 48/10; H04W 84/18; H04W 40/12; H04W 40/244; H04W 40/246; H04W 40/30; H04W 40/32; H04W 48/16; H04L 2012/2841; H04L 12/2809; H04L 12/282; B25J 13/006; G06F 3/0482; G05D 1/0016
See application file for complete search history.

(56) References Cited

U.S. PATENT DOCUMENTS 11,516,861 B2 * 11/2022 Glaenzer ............... H04W 76/14
12,168,291 B2 * 12/2024 Lee ..................... H04L 12/2825
(Continued)

FOREIGN PATENT DOCUMENTS

| CN | 105743957 A | 7/2016 |
|---|---|---|
| CN | 111965988 A | 11/2020 |
| CN | 113256954 A | 8/2021 |

*Primary Examiner* — Cindy Trandai (57) ABSTRACT

The present invention discloses a method and device for controlling an intelligent device, a computer device, and a storage medium. A major technical solution is as follows: acquiring, by a mobile terminal, broadcast messages of surrounding intelligent devices by means of Bluetooth scanning; displaying the broadcast messages of the intelligent devices with Bluetooth signal intensities exceeding a target numerical value on a screen interface of the mobile terminal; determining the intelligent device with the strongest Bluetooth signal displayed on the screen interface of the mobile terminal as a first intelligent device, and establishing a Bluetooth connection with the first intelligent device; and sending, by the mobile terminal, a device identification of a target intelligent device and a control instruction selected by a user from the intelligent devices displayed on the screen interface for controlling the target intelligent device to the first intelligent device when receiving the control instruction.

10 Claims, 10 Drawing Sheets

(51) Int. Cl.
*H04W 8/00* (2009.01)
*H04W 76/14* (2018.01)
*H04W 84/18* (2009.01)

(56) References Cited

U.S. PATENT DOCUMENTS

| | | | |
|---|---|---|---|
| 2016/0013980 A1* | 1/2016 | Mcknight | H04L 67/568 |
| | | | 709/221 |
| 2016/0278137 A1* | 9/2016 | Oguchi | H04W 4/80 |
| 2017/0280277 A1* | 9/2017 | Ge | H04W 4/00 |
| 2018/0192279 A1* | 7/2018 | Schenk-Cooper | H04W 4/38 |
| 2020/0359168 A1* | 11/2020 | Lee | H04W 4/80 |
| 2021/0373831 A1* | 12/2021 | Yu | G06F 3/1232 |
| 2021/0410201 A1* | 12/2021 | Kim | H04N 23/61 |
| 2022/0070247 A1* | 3/2022 | Wang | G06F 3/165 |
| 2023/0232321 A1* | 7/2023 | Pekarske | H04B 17/318 |
| | | | 455/434 |
| 2023/0362292 A1* | 11/2023 | Liu | H04L 12/2825 |

* cited by examiner

METHOD AND DEVICE FOR CONTROLLING INTELLIGENT DEVICE, COMPUTER DEVICE, AND STORAGE MEDIUM

CROSS-REFERENCE TO RELATED APPLICATIONS

The application claims priority to Chinese patent application No. 202210916152.0, filed on Aug. 1, 2022, the entire contents of which are incorporated herein by reference.

TECHNICAL FIELD

The present invention relates to the technical field of device control, and particularly relates to a method and device for controlling an intelligent device, a computer device, and a storage medium.

BACKGROUND

With increasingly popularization of intelligent devices, the intelligent devices are used more and more in places such as hotels and restaurants. However, at present, users can operate intelligent devices in places such as hotels only by way of wall control, which is inconvenient in operation and cannot make full use of features of the intelligent devices.

SUMMARY

The present invention provides a method and device for controlling an intelligent device, a computer device, and a storage medium for improving the control efficiency of the intelligent device.

An embodiment of the present invention provides a method for controlling an intelligent device, including:
  acquiring, by a mobile terminal, broadcast messages of surrounding intelligent devices by means of Bluetooth scanning when receiving an intelligent device connection instruction triggered by a user;
  determining a Bluetooth signal intensity corresponding to each intelligent device, and displaying the broadcast messages of the intelligent devices with Bluetooth signal intensities exceeding a target numerical value on a screen interface of the mobile terminal;
  determining the intelligent device with the strongest Bluetooth signal displayed on the screen interface of the mobile terminal as a first intelligent device, and establishing a Bluetooth connection with the first intelligent device; and
  sending, by the mobile terminal, a device identification of a target intelligent device and a control instruction selected by a user from the intelligent devices displayed on the screen interface for controlling the target intelligent device to the first intelligent device when receiving the control instruction, wherein the first intelligent device sends the control instruction to the target intelligent device according to the device identification, and the first intelligent device and the target intelligent device belong to a same ad-hoc network.

An embodiment of the present invention provides a device for controlling an intelligent device, including:
  an acquisition module, configured to acquire, by a mobile terminal, broadcast messages of surrounding intelligent devices by means of Bluetooth scanning when receiving an intelligent device connection instruction triggered by a user;
  a display module, configured to determine a Bluetooth signal intensity corresponding to each intelligent device, and to display the broadcast messages of the intelligent devices with Bluetooth signal intensities exceeding a target numerical value on a screen interface of the mobile terminal;
  a determination module, configured to determine the intelligent device with the strongest Bluetooth signal displayed on the screen interface of the mobile terminal as a first intelligent device, and to establish a Bluetooth connection with the first intelligent device; and
  a sending module, configured to send, by the mobile terminal, a device identification of a target intelligent device and a control instruction selected by a user from the intelligent devices displayed on the screen interface for controlling the target intelligent device to the first intelligent device when receiving the control instruction, wherein the first intelligent device sends the control instruction to the target intelligent device according to the device identification, and the first intelligent device and the target intelligent device belong to a same ad-hoc network A computer device, including a memory, a processor and a computer program stored in the memory and runnable on the processor, wherein the processor, when executing the computer program, implements the method for controlling the intelligent device.

A computer readable storage medium, having the computer program stored thereon, wherein the computer program, when being executed by a processor, implements the method for controlling the intelligent device.

According to the method and device for controlling an intelligent device, the computer device, and the storage medium provided by the present invention, the method includes: acquiring, by the mobile terminal, broadcast messages of surrounding intelligent devices by means of Bluetooth scanning, and then displaying the broadcast messages of the intelligent devices with Bluetooth signal intensities exceeding the target numerical value on the screen interface of the mobile terminal; determining the intelligent device with the strongest Bluetooth signal displayed on the screen interface of the mobile terminal as the first intelligent device, and establishing the Bluetooth connection with the first intelligent device; and sending, by the mobile terminal, the device identification and the control instruction of the target intelligent device to the first intelligent device when receiving the control instruction selected by the user from the intelligent devices displayed on the screen interface for controlling the target intelligent device, wherein the first intelligent device sends the control instruction to the target intelligent device according to the device identification, and the first intelligent device and the target intelligent device belong to the same ad-hoc network. Therefore, the plurality of intelligent devices in the ad-hoc network can be uniformly controlled through the mobile terminal in the present invention, so that the control efficiency of the intelligent devices is improved.

BRIEF DESCRIPTION OF DRAWINGS

To describe the technical solutions in the embodiments of the present invention more clearly, the drawings required for describing the embodiments are briefly introduced below. Apparently, the drawings in the following description are merely some embodiments of the present invention.

DETAILED DESCRIPTION OF THE EMBODIMENTS

The technical solution in the embodiments of the present invention will be clearly and intactly described below in combination with the drawings in the embodiments of the present invention. Apparently, the embodiments described are some embodiments rather than all embodiments of the present invention. On the basis of the embodiments in the present invention, all other embodiments obtained by those of ordinary skill in the art without making creative efforts fall into the scope of protection of the present invention.

Figure 1:
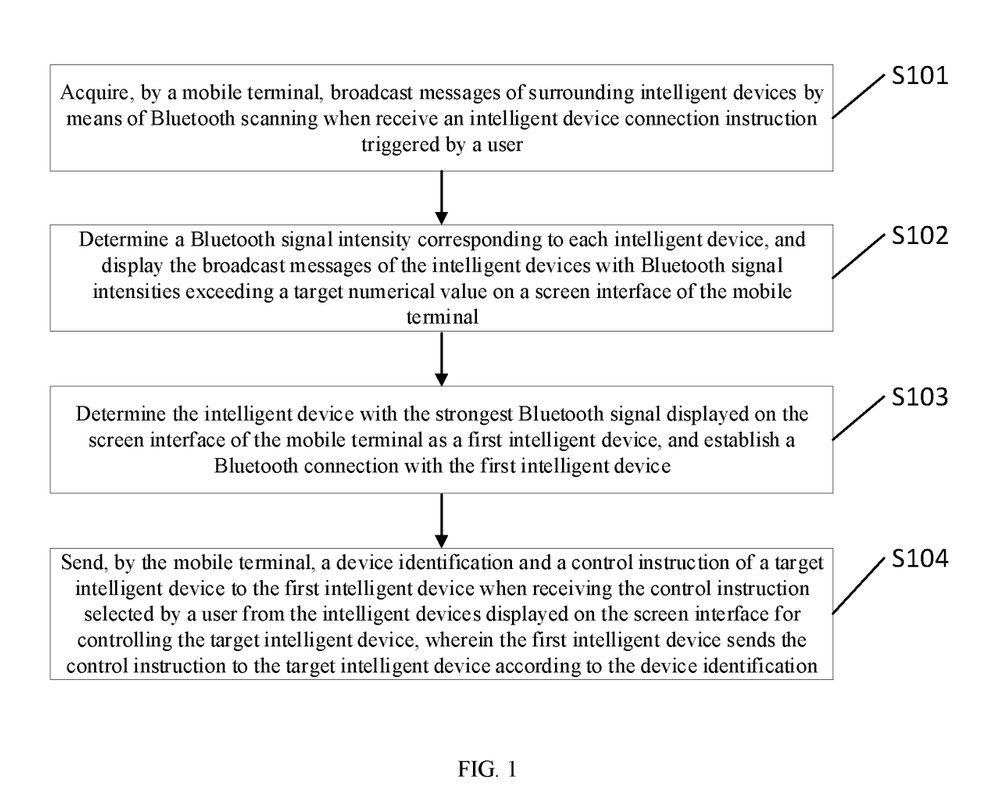
FIG. 1 is a flow diagram of a method for controlling an intelligent device in an embodiment of the present invention.

In an embodiment, as shown in FIG. 1, provided is a method for controlling an intelligent device. The method specifically includes the following steps:

S101: a mobile terminal acquires broadcast messages of surrounding intelligent devices by means of Bluetooth scanning when receiving an intelligent device connection instruction triggered by a user.

The intelligent device in the embodiment can be a device capable of being intelligently controlled, for example, a lamp, a television, an air conditioner, a sweeping robot, a curtain, and the like, which is not specifically defined herein. For example, an indoor lamp is controlled to be turned on, and an indoor air conditioner is controlled to be turned on by a mobile terminal, and the like.

Specifically, the user can trigger an intelligent device connection instruction through the mobile terminal, for example, the intelligent device connection instruction is triggered by an applet embedded into a communication program, the Bluetooth function in the mobile terminal can also be directly enabled, and then broadcast messages of surrounding intelligent devices are acquired by means of Bluetooth scanning.

The broadcast messages include identification information, location information, MAC addresses and the like of the intelligent devices, which is not specifically defined herein.

S102, a Bluetooth signal intensity corresponding to each intelligent device is determined, and the broadcast messages of the intelligent devices with Bluetooth signal intensities exceeding a target numerical value is displayed on a screen interface of the mobile terminal.

The target numerical value can be determined according to the Bluetooth signal intensity through which information can be successfully transmitted or according to a corresponding transmission distance; in a case where the Bluetooth signal intensity is too less, it is indicated that the intelligent device is too far away from the mobile terminal, indicating that the intelligent device may be the intelligent device in other rooms and the user has no access to control the intelligent device in other rooms. It shall be noted that the intelligent devices displayed on the screen interface of the mobile terminal in the embodiment include various types, for example, a lamp, a television and an air conditioner with the Bluetooth signal intensities between them and the mobile terminal exceeding the target numerical value, so the broadcast messages of the lamp, the television and the air conditioner can be displayed on the screen interface, i.e., the intelligent devices with different types and models in a same application can be controlled in the embodiment. Compared with a condition that the intelligent devices of different types in the prior art can be controlled only by corresponding applications, the intelligent devices of various types can be controlled through one application in the embodiment, and a condition that a plurality of applications need to be installed in the prior art to control the intelligent devices of various types is avoided, so that the control efficiency of the intelligent devices is improved by the embodiment.

In an optional embodiment provided by the present invention, since the location of the mobile terminal will change constantly, the mobile terminal in the embodiment acquires the broadcast messages of the surrounding intelligent devices in real time by means of Bluetooth scanning, displays the broadcast messages of the intelligent devices with the Bluetooth signal intensities exceeding the target numerical value on the screen interface of the mobile terminal, and then redetermine the intelligent device with the strongest Bluetooth signal intensity displayed on the screen interface of the mobile terminal at the preset time interval; and the redetermined intelligent device with the strongest Bluetooth signal intensity is determined as the first intelligent device. The preset time interval can specifically be 5 s, 10 s, 15 s, and the like, which is not specifically defined herein.

In the embodiment, since the intelligent device with the strongest Bluetooth signal intensity displayed on the screen interface of the mobile terminal is redetermined at the preset time interval, the redetermined first intelligent device is the intelligent device with the strongest Bluetooth signal intensity between it and the mobile terminal all the time to guarantee that the mobile terminal is connected to the intelligent device with the strongest Bluetooth signal intensity all the time, so as to guarantee the communicability of the control instruction sent by the mobile terminal to the first intelligent device in the subsequent steps.

S103: the intelligent device with the strongest Bluetooth signal displayed on the screen interface of the mobile terminal is determined as a first intelligent device, and a Bluetooth connection with the first intelligent device is established.

S104: the mobile terminal sends a device identification and a control instruction of a target intelligent device to the first intelligent device when receiving the control instruction selected by a user from the intelligent devices displayed on the screen interface for controlling the target intelligent device, wherein the first intelligent device sends the control instruction to the target intelligent device according to the device identification.

The intelligent devices displayed on the screen interface belong to a same ad-hoc network, i.e., the first intelligent device and the target intelligent device are located in the ad-hoc network, and the intelligent devices in the ad-hoc network adopt a short range transmission mode, for example, the intelligent devices in the ad-hoc network are connected by Bluetooth.

For example, the intelligent devices displayed on the screen interface include an air conditioner, a lamp 1, a lamp 2 and a television, wherein the lamp 1 is the intelligent device with the strongest Bluetooth signal intensity between the lamp and the mobile terminal, i.e., the lamp 1 is determined as the first intelligent device; in a case where the user wants to control the air conditioner to be turned on, the mobile terminal sends the device identification of the air conditioner and the control instruction (a turn-on instruction) to the lamp 1 first, and then the lamp 1 sends the turn-on instruction to the air conditioner, so that the air conditioner executes an air conditioner turn-on operation upon receiving the turn-on instruction.

It shall be noted that in a case where the user wants to directly control the lamp 1 to be turned on, the device identification of the lamp 1 and the turn-on instruction are directly sent to the lamp 1, and the lamp 1 determines that the received device identification is consistent with its own device identification upon receiving the instruction and directly executes the turn-on operation without sending out the instruction. That is, the target intelligent device in the embodiment and the first intelligent device are the same intelligent device.

A method for controlling an intelligent device provided by the present invention includes: acquiring, by a mobile terminal, broadcast messages of surrounding intelligent devices by means of Bluetooth scanning, and then displaying the broadcast messages of the intelligent devices with Bluetooth signal intensities exceeding a target numerical value on a screen interface of the mobile terminal; determining the intelligent device with the strongest Bluetooth signal displayed on the screen interface of the mobile terminal as a first intelligent device, and establishing a Bluetooth connection with the first intelligent device; and sending, by the mobile terminal, a device identification and a control instruction of a target intelligent device to the first intelligent device when receiving the control instruction selected by a user from the intelligent devices displayed on the screen interface for controlling the target intelligent device, wherein the first intelligent device sends the control instruction to the target intelligent device according to the device identification, and the first intelligent device and the target intelligent device belong to a same ad-hoc network. Therefore, the plurality of intelligent devices in the ad-hoc network can be uniformly controlled through the mobile terminal in the present invention, so that the control efficiency of the intelligent devices is improved.

Figure 2:
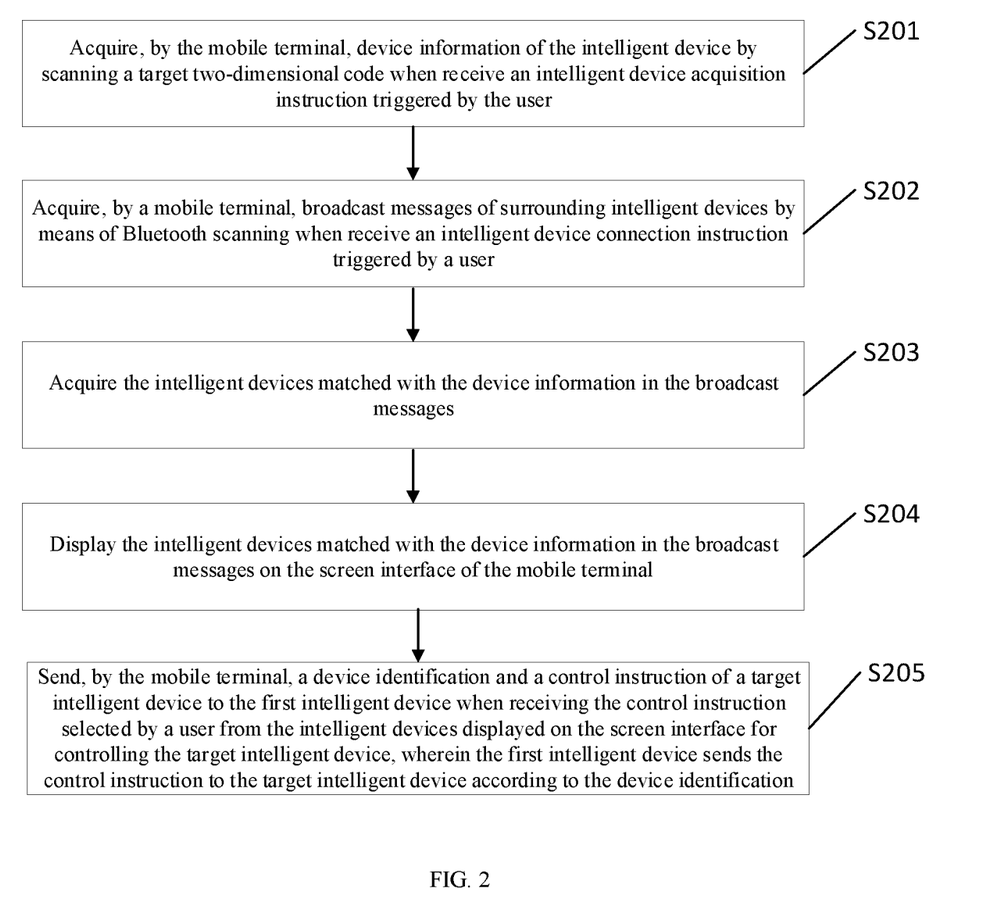
FIG. 2 is another flow diagram of a method for controlling an intelligent device in an embodiment of the present invention.

In an embodiment, as shown in FIG. 2, provided is another method for controlling an intelligent device. The method specifically includes the following steps:

S201: the mobile terminal acquires device information of the intelligent device by scanning a target two-dimensional code when receiving an intelligent device acquisition instruction triggered by the user.

Specifically, the user can trigger an intelligent device acquisition instruction through an application embedded into a communication program, i.e., enable a camera scanning function through the application and then scan the target two-dimensional code to acquire the device information of the intelligent device. The device information of the intelligent devices can specifically be identification information, MAC addresses, location position, and the like corresponding to the plurality of intelligent devices, respectively.

In an application scenario provided in the embodiment, in a case where the user checks in a room A of a certain hotel, the user can scan a two-dimensional code pasted in the room A through the application to acquire the intelligent devices capable of being intelligently controlled in the room A. In case where a lamp 1, a lamp 2 and an air conditioner in the room A can be intelligently controlled, the identification information, the MAC addresses and location position corresponding to the lamp 1, the lamp 2 and the air conditioner will be acquired by scanning the two-dimensional code in the room.

S202: acquiring, by a mobile terminal, broadcast messages of surrounding intelligent devices by means of Bluetooth scanning when receiving an intelligent device connection instruction triggered by a user.

S203: the intelligent devices matched with the device information in the broadcast messages are acquired.

For example, the device information acquired by scanning the two-dimensional code includes an intelligent device 1, an intelligent device 2 and an intelligent device 3, and the broadcast messages of the surrounding intelligent devices acquired by means of Bluetooth scanning include the intelligent device 1, the intelligent device 2 and an intelligent device 4, so the matched intelligent devices are the intelligent device 1 and the intelligent device 2.

S204: the intelligent devices matched with the device information in the broadcast messages are displayed on the screen interface of the mobile terminal.

Specifically, the intelligent devices matched with the device information in the broadcast messages are displayed on the screen interface of the mobile terminal according to the Bluetooth signal intensities from strong to weak; and the intelligent devices matched with the device information in the broadcast messages are displayed on the screen interface of the mobile terminal according to the types of the intelligent devices. For example, all the intelligent devices which are the lamps are arranged and displayed first, then all the intelligent devices which are curtains are then displayed, and finally, the intelligent devices (air conditioners, televisions, and the like) of other types are displayed, which is not specifically defined herein.

Further, after S203, the method further includes: the intelligent devices with the Bluetooth signal intensities exceeding the target numerical value are acquired from the matched intelligent devices; and correspondingly, S204 includes: the intelligent devices, with the Bluetooth signal intensities exceeding the target numerical value, matched with the device information are displayed on the display interface of the mobile terminal. That is, the intelligent devices displayed on the screen interface are determined in two dimensions: two-dimensional code and Bluetooth scanning in the embodiment to guarantee that the intelligent devices controlled by the user are in a certain geographical range.

For example, the device information acquired by the two-dimensional code includes an intelligent device 1, an intelligent device 2 and an intelligent device 3, and the broadcast messages of the surrounding intelligent devices acquired by means of Bluetooth scanning include the intelligent device 1, the intelligent device 2, an intelligent device 3 and an intelligent device 4, indicating that the intelligent device 4 may be the intelligent device in an adjacent room and the user in the current room has no access to control it. Therefore, the intelligent devices capable of being controlled by the user include the intelligent device 1, the intelligent device 2 and the intelligent device 3. However, in a case where the Bluetooth signal intensity between the intelligent device 3 and the mobile terminal is less than the target numerical value, it is indicated that the intelligent device 3 may has a Bluetooth function abnormal problem, and in this case, there is a probability that whether the mobile terminal or the other intelligent devices send the control instruction to the intelligent device 3 unsuccessfully. Therefore, the intelligent devices with the Bluetooth signal intensities exceeding the target numerical value are displayed on the screen interface of the mobile terminal in the embodiment to guarantee that the sent control instruction is capable of being received.

S205: the mobile terminal sends a device identification and a control instruction of a target intelligent device to the first intelligent device when receiving the control instruction selected by a user from the intelligent devices displayed on the screen interface for controlling the target intelligent device, wherein the first intelligent device sends the control instruction to the target intelligent device according to the device identification.

The first intelligent device and the target intelligent device belong to a same ad-hoc network.

The method for controlling an intelligent device provided in the embodiment includes displaying the intelligent devices, with the Bluetooth signal intensities exceeding the target numerical value, matched with the device information on the display interface of the mobile terminal, to guarantee that the sent control instruction is capable of being received. The mobile terminal sends the device identification and the control instruction of the target intelligent device to the first intelligent device when receiving the control instruction selected by the user from the intelligent devices displayed on the screen interface for controlling the target intelligent device, wherein the first intelligent device sends the control instruction to the target intelligent device according to the device identification, so that the target intelligent device executes the control instruction. Since the intelligent devices acquired according to the Bluetooth signal intensities and by two-dimensional code scanning are displayed on the screen interface in the embodiment, effective and precise control of the intelligent devices can be improved by the embodiment, and other intelligent devices are prevented from being controlled mistakenly.

Figure 3:
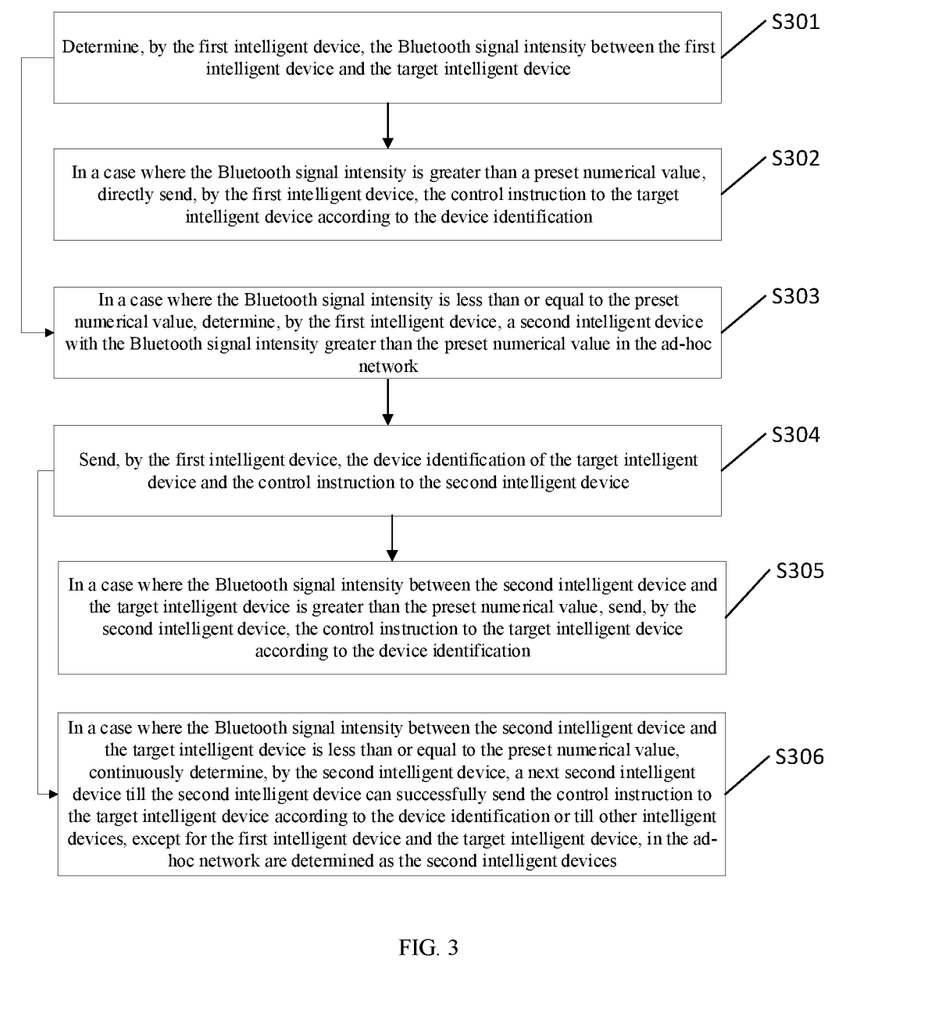
FIG. 3 is a flow diagram where a control instruction is sent to a target intelligent device in an embodiment of the present invention.

In an embodiment, as shown in FIG. 3, the step of sending, by the first intelligent device, the control instruction to the target intelligent device according to the device identification includes:

S301: the first intelligent device determines the Bluetooth signal intensity between the first intelligent device and the target intelligent device.

Figure 3A:
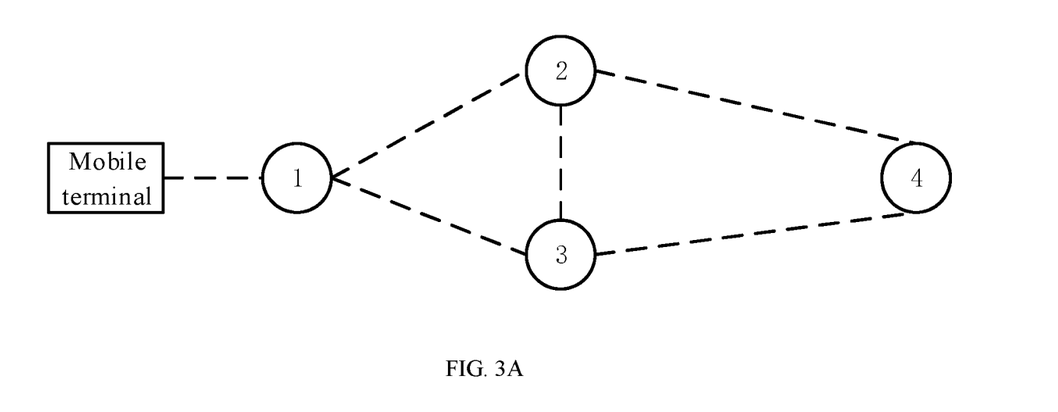
FIG. 3A is an example diagram where a control instruction is transmitted in an embodiment of the present invention.

As shown in FIG. 3A, the mobile terminal establishes a Bluetooth connection with the intelligent device 1, i.e., the intelligent device 1 is the first intelligent device; it is needed to determine the Bluetooth signal intensity between the first intelligent device and the target intelligent device upon receiving the control instruction sent by the mobile terminal to the target intelligent device (the intelligent device 4); in a case where the Bluetooth signal intensity is greater than the preset numerical value, S302 is executed: the intelligent device 1 directly sends the control instruction to the intelligent device 4 according to the device identification; and in a case where the Bluetooth signal intensity is less than or equal to the preset numerical value, S303 is executed: the intelligent device 1 determines the second intelligent device with the Bluetooth signal intensity greater than the preset numerical value in the ac-hoc network.

S302: in a case where the Bluetooth signal intensity is greater than a preset numerical value, the first intelligent device directly sends the control instruction to the target intelligent device according to the device identification.

The preset numerical value is determined according to the Bluetooth signal intensity capable of successfully transmitting data between the two devices, wherein the preset numerical value is greater than the target numerical values given in the corresponding embodiments in FIG. 1. In combination with FIG. 3A, even if the Bluetooth signal intensity between the mobile terminal and each intelligent device exceeds the target numerical value and the signal intensity is not enough to support burst transmission of the data, before the control instruction is sent to the target intelligent device in the embodiment, it is needed to further determine whether the Bluetooth signal intensity between the first intelligent device and the target intelligent device is greater than the preset numerical value; if the Bluetooth signal intensity between the first intelligent device and the target intelligent device is greater than the preset numerical value, the first intelligent device directly transmits the control instruction to the target intelligent device; if Bluetooth signal intensity between the first intelligent device and the target intelligent device is less than or equal to the preset numerical value, the first intelligent device needs to search for the second intelligent device, and the second intelligent device, as a transfer station, transmits the control instruction to the target intelligent device.

S303: in a case where the Bluetooth signal intensity is less than or equal to the preset numerical value, the first intelligent device determines a second intelligent device with the Bluetooth signal intensity greater than the preset numerical value in the ad-hoc network.

S304: the first intelligent device sends the device identification of the target intelligent device and the control instruction to the second intelligent device.

As shown in FIG. 3A, in a case where the first intelligent device determines that the second intelligent devices with the Bluetooth signal intensity thereof is greater than the preset numerical value in the ac-hoc network as the intelligent device 2 and the intelligent device 3, the first intelligent device sends the device identification of the target intelligent device and the control instruction to the intelligent device 2 or the intelligent device 3.

S305: in a case where the Bluetooth signal intensity between the second intelligent device and the target intelligent device is greater than the preset numerical value, the second intelligent device sends the control instruction to the target intelligent device according to the device identification.

In the embodiment, in a case where the Bluetooth signal intensity between the intelligent device 2 or the intelligent device 3 and the target intelligent device is greater than the preset numerical value, the intelligent device 2 or the intelligent device 3 sends the control instruction to the target intelligent device according to the device identification.

S306: in a case where the Bluetooth signal intensity between the second intelligent device and the target intelligent device is less than or equal to the preset numerical value, the second intelligent device continuously determines a next second intelligent device till the second intelligent device can successfully send the control instruction to the target intelligent device according to the device identification or till other intelligent devices, except for the first intelligent device and the target intelligent device, in the ad-hoc network are determined as the second intelligent devices.

Figure 3B:
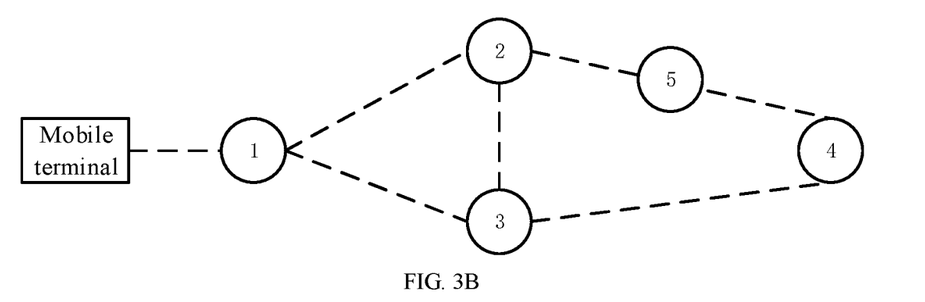
FIG. 3B is an example diagram where another control instruction is transmitted in an embodiment of the present invention.

In a case where the Bluetooth signal intensities between the intelligent device 2 and the intelligent device 3 and the target intelligent device are less than or equal to the preset numerical value as well, the intelligent device 2 or the intelligent device 3 continuously determines the next second intelligent device. As shown in FIG. 3B, in a case where the next second intelligent device determined by the intelligent device 2 is an intelligent device 5, and the Bluetooth signal intensity between the intelligent device 5 and the intelligent device 4 is greater than the preset numerical value, a finally determined sequence of sending the control instruction in sequence is as follows: first intelligent device 1-second intelligent device 2-second intelligent device 4-target intelligent device 4, thereby, so far, achieving a process of successfully sending the control instruction sent by the mobile terminal to the intelligent device 4.

Figure 4:
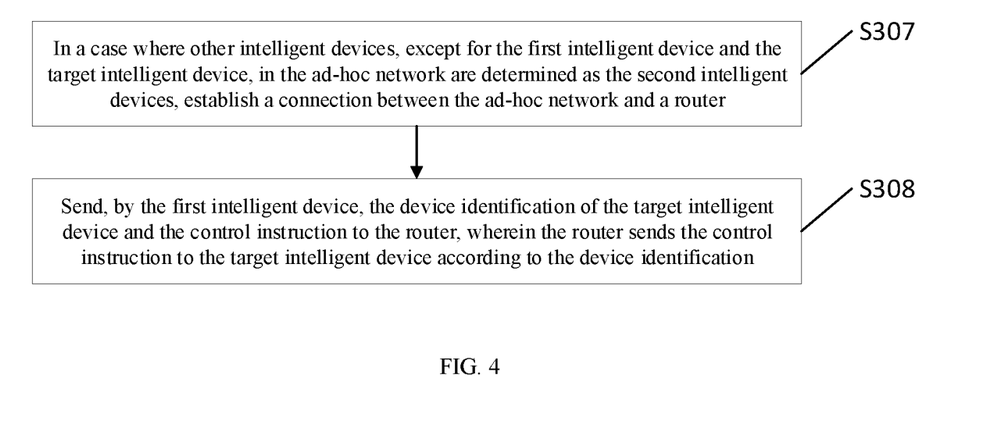
FIG. 4 is a diagram where a connection between an ad-hoc network and a router is established in an embodiment of the present invention.

In a case where the Bluetooth signal intensities between the intelligent device 2 and the intelligent device 3 and the target intelligent device are less than or equal to the preset numerical value as well, the intelligent device 2 or the intelligent device 3 continuously determines the next second intelligent device. However, there are no first intelligent device (intelligent device 1) and the target intelligent device (intelligent device 4) in FIG. 3A, and other intelligent devices are determined as the second intelligent devices, so searching of the second intelligent devices is stopped. As shown in FIG. 4, the control instruction is sent to the target intelligent device by the following way:

S307: in a case where other intelligent devices, except for the first intelligent device and the target intelligent device, in the ad-hoc network are determined as the second intelligent devices, a connection between the ad-hoc network and a router is established.

S308: the first intelligent device sends the device identification of the target intelligent device and the control instruction to the router, wherein the router sends the control instruction to the target intelligent device according to the device identification.

Specifically, the step of establishing a connection between the ad-hoc network and the router includes: determining the intelligent device with the strongest signal intensity between the intelligent device and the router in the ad-hoc network as a networking device; and establishing a network connection between the router and the networking device. Correspondingly, the step of sending, by the first intelligent device, the device identification of the target intelligent device and the control instruction to the router includes: sending, by the first intelligent device, the device identification of the target intelligent device and the control instruction to the networking device; and sending, by the networking device, the device identification of the target intelligent device and the control instruction to the router, wherein the router sends the control instruction to the target intelligent device according to the device identification.

Figure 4A:
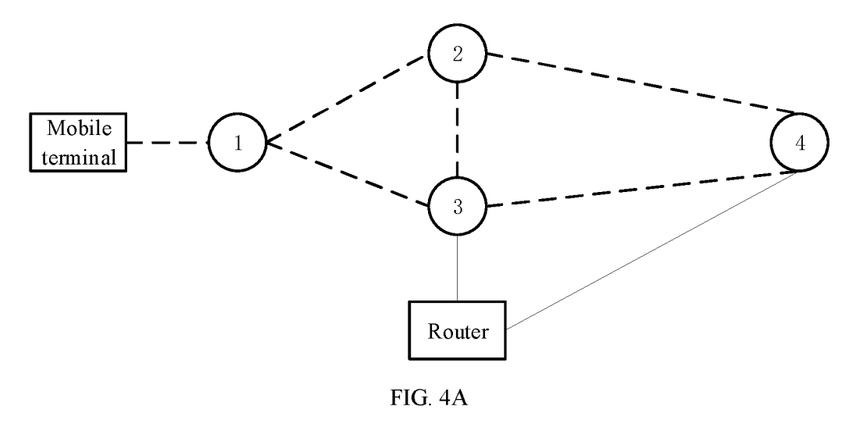
FIG. 4A is an example diagram where a connection with the router is established in an embodiment of the present invention.

As shown in FIG. 4A, in a case where other intelligent devices, except for the first intelligent device and the target intelligent device, in the ad-hoc network are determined as the second intelligent devices, it is needed to establish a connection between the ad-hoc network and a router. Specifically, the intelligent device 3 with the strongest signal intensity between it and the router in the ac-hoc network is determined as the networking device, then the first intelligent device sends the device identification of the target intelligent device and the control instruction to the intelligent device 3, and the intelligent device 3 sends the device identification of the target intelligent device and the control instruction to the router, so that the router sends the control instruction to the target intelligent device according to the device identification.

It shall be noted that the dotted portion in FIG. 4A represent short-range transmission, and the full line represents network transmission. The networking device in the embodiment can be set as an accessory of the first intelligent device, i.e., the networking device can perform information transmission with the first intelligent device directly without other intelligent devices.

Figure 4B:
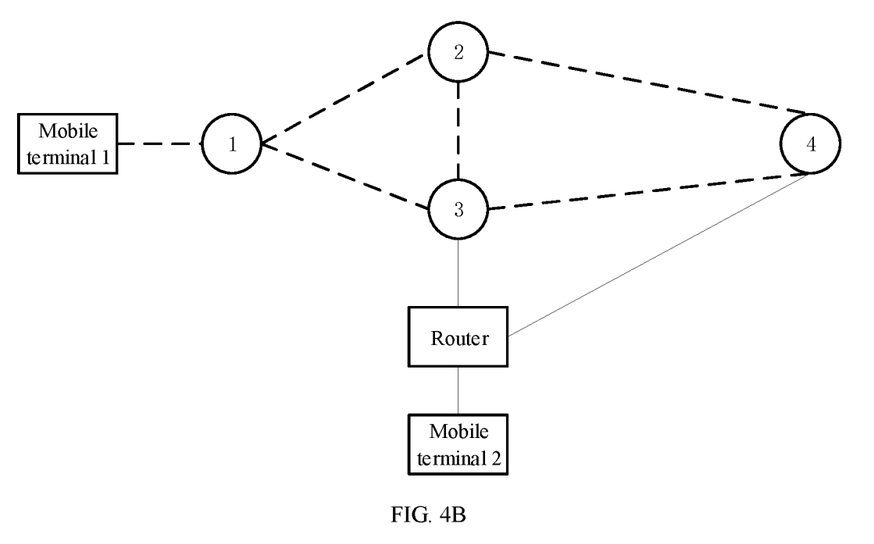
FIG. 4B is an example diagram of an application scenario in an embodiment of the present invention.

As shown in FIG. 4B, in an application scenario provided by the present invention, the mobile terminal 1 is a user checking in a hotel, and the mobile terminal 2 is an administrator of the hotel. That is to say, the check-in user can control the intelligent devices in the check-in room only by the short-range transmission mode (Bluetooth), for example, the user controls the intelligent devices in the room by the applet embedded into the communication program; and the administrator can control all the intelligent devices by the network transmission mode, without a distance requirement.

It shall be understood that, a magnitude of a sequence number of each process in the above embodiments does not mean an execution sequence and the execution sequence of each process should be determined by its function and an internal logic and shall not form any limit to an implementation process of the embodiments of the present invention.

Figure 5:
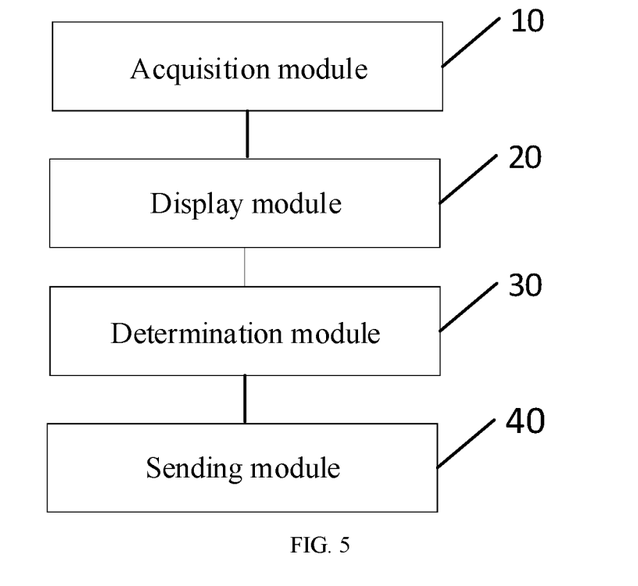
FIG. 5 is a functional block diagram of a device for controlling an intelligent device in an embodiment of the present invention.

In an embodiment, provided is a device for controlling an intelligent device. The device for controlling an intelligent device is in one-to-one correspondence to the method for controlling an intelligent device in the above embodiments. As shown in the FIG. 5, the device for controlling an intelligent device includes an acquisition module 10, a display module 20, a determination module 30, and a sending recognition module 40. Each functional module is described in detail below:

The acquisition module 10 is configured to acquire, by a mobile terminal, broadcast messages of surrounding intelligent devices by means of Bluetooth scanning when receiving an intelligent device connection instruction triggered by a user;

the display module 20 is configured to determine a Bluetooth signal intensity corresponding to each intelligent device, and to display the broadcast messages of the intelligent devices with Bluetooth signal intensities exceeding a target numerical value on a screen interface of the mobile terminal;

the determination module 30 is configured to determine the intelligent device with the strongest Bluetooth signal displayed on the screen interface of the mobile terminal as a first intelligent device, and to establish a Bluetooth connection with the first intelligent device; and a sending module 40 is configured to send, by the mobile terminal, a device identification of a target intelligent device and a control instruction selected by a user from the intelligent devices displayed on the screen interface for controlling the target intelligent device to the first intelligent device when receiving the control instruction, wherein the first intelligent device sends the control instruction to the target intelligent device according to the device identification, and the first intelligent device and the target intelligent device belong to a same ad-hoc network.

In an optional embodiment, the acquisition module 10 is further configured to acquire, by the mobile terminal, device information of the intelligent device by scanning a target two-dimensional code when receiving an intelligent device acquisition instruction triggered by the user;

the acquisition module 10 is further configured to acquire the intelligent devices matched with the device information in the broadcast messages; and the display module 20 is configured to display the intelligent devices matched with the device information in the broadcast messages on the screen interface of the mobile terminal.

In an optional embodiment, the acquisition module 10 is further configured to acquire the intelligent devices with the Bluetooth signal intensities exceeding the target numerical value from the matched intelligent devices; and the display module 20 is configured to display the intelligent devices, with the Bluetooth signal intensities exceeding the target numerical value, matched with the device information on the display interface of the mobile terminal.

In an optional embodiment, the determination module 30 is configured to redetermine the intelligent device with the strongest Bluetooth signal displayed on the screen interface of the mobile terminal at a preset time interval; and the determination module 30 is configured to determine the redetermined intelligent device with the strongest Bluetooth signal intensity as the first intelligent device.

In an optional embodiment, the sending module 40 is specifically configured to:

determine, by the first intelligent device, the Bluetooth signal intensity between the first intelligent device and the target intelligent device;

in a case where the Bluetooth signal intensity is greater than a preset numerical value, directly send, by the first intelligent device, the control instruction to the target intelligent device according to the device identification;

in a case where the Bluetooth signal intensity is less than or equal to the preset numerical value, determine, by the first intelligent device, a second intelligent device with the Bluetooth signal intensity greater than the preset numerical value in the ad-hoc network;

send, by the first intelligent device, the device identification of the target intelligent device and the control instruction to the second intelligent device;

in a case where the Bluetooth signal intensity between the second intelligent device and the target intelligent device is greater than the preset numerical value, send, by the second intelligent device, the control instruction to the target intelligent device according to the device identification; and in a case where the Bluetooth signal intensity between the second intelligent device and the target intelligent device is less than or equal to the preset numerical value, continuously determine, by the second intelligent device, a next second intelligent device till the second intelligent device successfully sends the control instruction to the target intelligent device according to the device identification or till other intelligent devices, except for the first intelligent device and the target intelligent device, in the ad-hoc network are determined as the second intelligent devices.

In an optional embodiment, the sending module 40 is further specifically configured to:

in a case where other intelligent devices, except for the first intelligent device and the target intelligent device, in the ad-hoc network are determined as the second intelligent devices, establish a connection between the ad-hoc network and a router; and send, by the first intelligent device, the device identification of the target intelligent device and the control instruction to the router, wherein the router sends the control instruction to the target intelligent device according to the device identification.

In an optional embodiment, the sending module 40 is further specifically configured to:

determine the intelligent device with the strongest signal intensity between the intelligent device and the router in the ad-hoc network as a networking device; and establish a network connection between the router and the networking device; and the step of sending, by the first intelligent device, the device identification of the target intelligent device and the control instruction to the router includes:

sending, by the first intelligent device, the device identification of the target intelligent device and the control instruction to the networking device; and sending, by the networking device, the device identification of the target intelligent device and the control instruction to the router, wherein the router sends the control instruction to the target intelligent device according to the device identification.

Specific definition of the device for controlling an intelligent device can refer to the definition of a control calculation method for an intelligent device, which is not described in detail herein. The modules in the above device for controlling an intelligent device can be fully or partially achieved by means of software, hardware and a combination thereof. The above modules can be embedded into a processor in a computer device in the form of hardware or can be independent from the processor in the computer device, and can also be stored in a memory in the computer device in the form of software, for the convenience of the process to call corresponding operations to execute the above modules.

Figure 6:
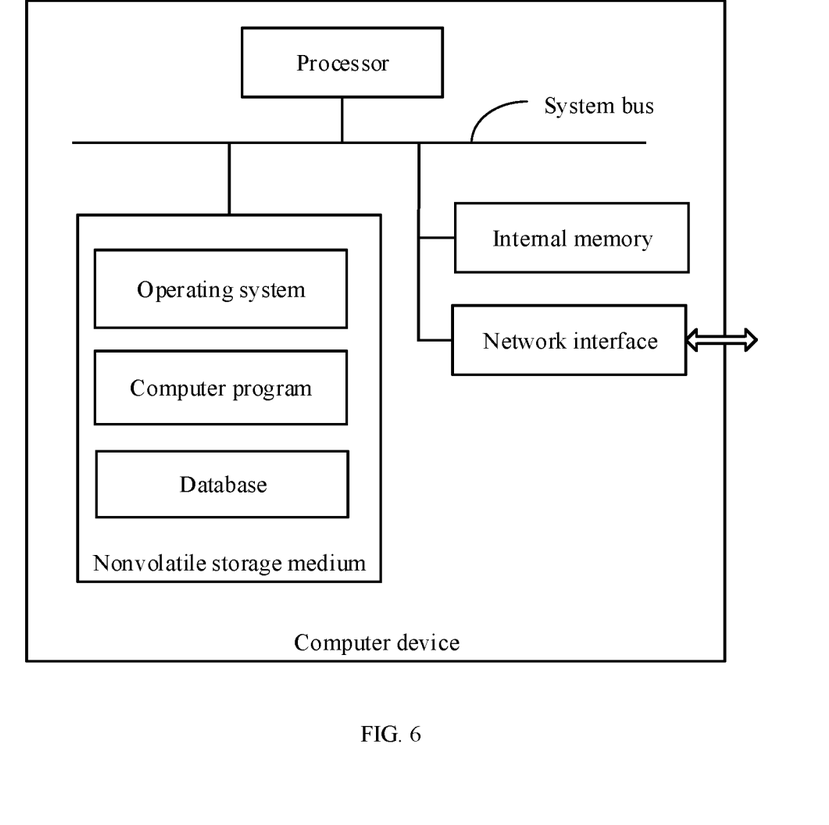
FIG. 6 is a schematic block diagram of a computer device in an embodiment of the present invention.

In an embodiment, provided is a computer device, wherein the computer device can be a server, the internal structure of which can be shown in FIG. 6. The computer device includes a processor, a memory, a network interface and a database connected via a system bus. The processor of the computer is configured to provide calculation and control abilities. The memory of the computer device includes a nonvolatile storage medium and an internal memory. The nonvolatile storage medium stores an operating system, a computer program and a database. The internal memory provides an environment for operation of the operating system and the computer program in the nonvolatile storage medium. The network interface of the computer device is used for connected communication with an external terminal via a network. The computer program, when being executed by the processor, implements a method for controlling an intelligent device.

In an embodiment, provided is a computer device, including a memory, a processor and a computer program stored in the memory and runnable on the processor, wherein the processor, when executing the computer program, implements the following steps:

acquiring, by a mobile terminal, broadcast messages of surrounding intelligent devices by means of Bluetooth scanning when receiving an intelligent device connection instruction triggered by a user;

determining a Bluetooth signal intensity corresponding to each intelligent device, and displaying the broadcast messages of the intelligent devices with Bluetooth signal intensities exceeding a target numerical value on a screen interface of the mobile terminal;

determining the intelligent device with the strongest Bluetooth signal displayed on the screen interface of the mobile terminal as a first intelligent device, and establishing a Bluetooth connection with the first intelligent device; and sending, by the mobile terminal, a device identification of a target intelligent device and a control instruction selected by a user from the intelligent devices displayed on the screen interface for controlling the target intelligent device to the first intelligent device when receiving the control instruction, wherein the first intelligent device sends the control instruction to the target intelligent device according to the device identification, and the first intelligent device and the target intelligent device belong to a same ad-hoc network.

In an embodiment, provided is a computer readable storage medium, having a computer program stored thereon, wherein the computer program, when being executed by a processor, implements the following steps:

acquiring, by a mobile terminal, broadcast messages of surrounding intelligent devices by means of Bluetooth scanning when receiving an intelligent device connection instruction triggered by a user;

determining a Bluetooth signal intensity corresponding to each intelligent device, and displaying the broadcast messages of the intelligent devices with Bluetooth signal intensities exceeding a target numerical value on a screen interface of the mobile terminal;

determining the intelligent device with the strongest Bluetooth signal displayed on the screen interface of the mobile terminal as a first intelligent device, and establishing a Bluetooth connection with the first intelligent device; and sending, by the mobile terminal, a device identification of a target intelligent device and a control instruction selected by a user from the intelligent devices displayed on the screen interface for controlling the target intelligent device to the first intelligent device when receiving the control instruction, wherein the first intelligent device sends the control instruction to the target intelligent device according to the device identification, and the first intelligent device and the target intelligent device belong to a same ad-hoc network.

Those of ordinary skill in the art can understand that all or part of flows in the methods of the embodiment is implemented by instructing related hardware via the computer program. The computer program can be stored in a nonvolatile computer readable storage medium. When the computer program is executed, it can include flows of the embodiments of the above methods. Any citation of the memory, storage, database or other media provided by the application and used in the embodiments can include a nonvolatile and/or volatile memory. The nonvolatile volatile memory can include a read-only memory (ROM), a programmable ROM (PROM), an electrically programmable ROM (EPROM), an electrically erasable programmable ROM (EEPROM) or a flash memory. The volatile memory can include a random access memory (RAM) or an external high speed cache memory. As description rather than limitation, the RAM can be obtained in various forms, for example, a static RAM (SRAM), a dynamic RAM (DRAM), a synchronous DRAM (SDRAM), a double data rate SDRM (SSRSDRAM), an enhanced SDRAM (ESDRAM), a synchronization link (Synchlink) DRAM (SLDRAM), a memory bus (Rambus) direct RAM (RDRAM), a direct memory bus dynamic RAM (DRDRAM), a memory bus dynamic RAM (RDRAM), and the like.

Those skilled in the art can clearly understand that for convenience and conciseness of description, illustration is made with division of the abovementioned functional units and modules; and in an actual application, the abovementioned function distribution can be completed by different functional units and modules as needed, i.e., the internal structure of the device is divided into different functional groups or modules to complete all or part of the above described functions.

The above embodiments are merely used for explaining the technical solution of the present invention rather than limiting the present invention. Despite reference to the aforementioned embodiments to make a detailed description for the present invention, it will be understood by those of ordinary skill in the art that they still can modify the technical solutions recorded by the aforementioned embodiments or make equivalent substitutions on part of technical features therein. The modifications or substitutions do not deviate the nature of the corresponding technical solution from the spirit and scope of the technical solution embodied in the embodiments of the present invention, and shall all be included in the protection scope of the present invention.

What is claimed is:

1. A method for controlling an intelligent device, applied to a mobile terminal, the method comprising:

acquiring, by a mobile terminal, broadcast messages of surrounding intelligent devices by means of Bluetooth scanning when receiving an intelligent device connection instruction triggered by a user;

determining a Bluetooth signal intensity corresponding to each intelligent device, and displaying the broadcast messages of the intelligent devices with Bluetooth signal intensities exceeding a target numerical value on a screen interface of the mobile terminal;

determining the intelligent device with the strongest Bluetooth signal displayed on the screen interface of the mobile terminal as a first intelligent device, and establishing a Bluetooth connection with the first intelligent device; and sending, by the mobile terminal, a device identification of a target intelligent device and a control instruction selected by a user from the intelligent devices displayed on the screen interface for controlling the target intelligent device to the first intelligent device when receiving the control instruction, wherein the first intelligent device sends the control instruction to the target intelligent device according to the device identification, and the first intelligent device and the target intelligent device belong to a same ad-hoc network.

2. The method according to claim 1, further comprising:

acquiring, by the mobile terminal, device information of the intelligent device by scanning a target two-dimensional code when receiving an intelligent device acquisition instruction triggered by the user;

acquiring the intelligent devices matched with the device information in the broadcast messages; and displaying the intelligent devices matched with the device information in the broadcast messages on the screen interface of the mobile terminal.

3. The method according to claim 2, further comprising:
acquiring the intelligent devices with the Bluetooth signal intensities exceeding the target numerical value from the matched intelligent devices; and
displaying the intelligent devices, with the Bluetooth signal intensities exceeding the target numerical value, matched with the device information on the display interface of the mobile terminal.

4. The method according to claim 1, further comprising:
redetermining the intelligent device with the strongest Bluetooth signal displayed on the screen interface of the mobile terminal at a preset time interval; and
determining the redetermined intelligent device with the strongest Bluetooth signal intensity as the first intelligent device.

5. The method according to claim 1, wherein the step of sending, by the first intelligent device, the control instruction to the target intelligent device according to the device identification comprises:
determining, by the first intelligent device, the Bluetooth signal intensity between the first intelligent device and the target intelligent device;
in a case where the Bluetooth signal intensity is greater than a preset numerical value, directly sending, by the first intelligent device, the control instruction to the target intelligent device according to the device identification;
in a case where the Bluetooth signal intensity is less than or equal to the preset numerical value, determining, by the first intelligent device, a second intelligent device with the Bluetooth signal intensity greater than the preset numerical value in the ad-hoc network;
sending, by the first intelligent device, the device identification of the target intelligent device and the control instruction to the second intelligent device;
in a case where the Bluetooth signal intensity between the second intelligent device and the target intelligent device is greater than the preset numerical value, sending, by the second intelligent device, the control instruction to the target intelligent device according to the device identification; and
in a case where the Bluetooth signal intensity between the second intelligent device and the target intelligent device is less than or equal to the preset numerical value, continuously determining, by the second intelligent device, a next second intelligent device till the second intelligent device successfully sends the control instruction to the target intelligent device according to the device identification or till other intelligent devices, except for the first intelligent device and the target intelligent device, in the ad-hoc network are determined as the second intelligent devices.

6. The method according to claim 5, further comprising:
in a case where other intelligent devices, except for the first intelligent device and the target intelligent device, in the ad-hoc network are determined as the second intelligent devices, establishing a connection between the ad-hoc network and a router; and
sending, by the first intelligent device, the device identification of the target intelligent device and the control instruction to the router, wherein the router sends the control instruction to the target intelligent device according to the device identification.

7. The method according to claim 6, wherein the step of establishing a connection between the ad-hoc network and the router comprises:
determining the intelligent device with the strongest signal intensity between the intelligent device and the router in the ad-hoc network as a networking device; and establishing a network connection between the router and the networking device; and
the step of sending, by the first intelligent device, the device identification of the target intelligent device and the control instruction to the router comprises:
sending, by the first intelligent device, the device identification of the target intelligent device and the control instruction to the networking device; and
sending, by the networking device, the device identification of the target intelligent device and the control instruction to the router, wherein the router sends the control instruction to the target intelligent device according to the device identification.

8. A device for controlling an intelligent device, comprising:
an acquisition module, configured to acquire, by a mobile terminal, broadcast messages of surrounding intelligent devices by means of Bluetooth scanning when receiving an intelligent device connection instruction triggered by a user;
a display module, configured to determine a Bluetooth signal intensity corresponding to each intelligent device, and to display the broadcast messages of the intelligent devices with Bluetooth signal intensities exceeding a target numerical value on a screen interface of the mobile terminal;
a determination module, configured to determine the intelligent device with the strongest Bluetooth signal displayed on the screen interface of the mobile terminal as a first intelligent device, and to establish a Bluetooth connection with the first intelligent device; and
a sending module, configured to send, by the mobile terminal, a device identification of a target intelligent device and a control instruction selected by a user from the intelligent devices displayed on the screen interface for controlling the target intelligent device to the first intelligent device when receiving the control instruction, wherein the first intelligent device sends the control instruction to the target intelligent device according to the device identification, and the first intelligent device and the target intelligent device belong to a same ad-hoc network.

9. A computer device, comprising a memory, a processor and a computer program stored in the memory and runnable on the processor, wherein the processor, when executing the computer program, implements the method for controlling the intelligent device according to claim 1.

10. A computer readable storage medium, having a computer program stored thereon, wherein the computer program, when being executed by a processor, implements the method for controlling the intelligent device according to claim 1.

* * * * *